3,152,102
WATER-SOLUBLE POLYVINYL ALCOHOL-UREA REACTION PRODUCTS

Hideo Suzumura, Katsuaki Hirano, and Teiichiro Chiba, Kurashiki, Japan, assignors to Kurashiki Rayon Co., Ltd., Okayama, Japan, a corporation of Japan
No Drawing. Filed Dec. 1, 1961, Ser. No. 156,517
Claims priority, application Japan Dec. 9, 1960
4 Claims. (Cl. 260—77.5)

The invention relates to the preparation of derivatives of polyvinyl alcohol and is more particularly concerned with nitrogen-containing polyvinyl alcohol derivatives which are readily soluble in cold water.

Polyvinyl alcohol has recently come to be used extensively as a base for various types of adhesives and finishing agents for woven fabrics because of the binding power of its aqueous solutions, and because of the tenacity, gloss, agreeable feel, and like desirable characteristics of films obtained from aqueous solutions of polyvinyl alcohol. However, known polyvinyl alcohols generally require the use of heat to put them into solution in water or they are, at best, dissolved in cold water only with difficulty.

As is well known, an aqueous solution of fully saponified polyvinyl alcohol can not be obtained unless dissolution is effected by heating. Accordingly, in seeking a polyvinyl alcohol of cold-water-solubility, partially-saponified polyvinyl alcohol has been used. However, even this presents problems. For example, it is necessary to impart to the mixture of water and polyvinyl alcohol a relatively violent agitation. When such agitation is not provided, even the partially-saponified polyvinyl alcohol will rapidly swell as it comes into contact with the water, with the resultant formation of gels which enclose and trap undissolved polyvinyl alcohol particles, giving rise to undissolved powder lumps. When such undissolved powder lumps form, further dissolution is greatly retarded. There has existed, therefore, an unfilled need for a polyvinyl alcohol which is freely soluble in cold water without need for violent agitation and like special techniques.

It is thus an object of this invention to provide a polyvinyl alcohol which will rapidly and freely dissolve in cold water.

It is another object of the invention to provide a process of producing a polyvinyl alcohol of good cold-water-solubility.

It is known that urea and alcohols will interact upon heating at high temperatures. It is also known that polyvinyl alcohol which is, chemically, a type of polyvalent alcohol, will react with urea upon heating in the presence of ethylene glycol or water (Paquin, Z. Naturforshung 1, 518, 1946). We have investigated the relationship between the character of the products of reaction between polyvinyl alcohol and urea and the conditions of reaction. We have found that by proper control of the conditions of reaction, highly water-soluble polyvinyl alcohol derivatives can be obtained. We have also ascertained that when a large quantity of water or ethylene glycol is present at the time of reaction, the reaction between polyvinyl alcohol and urea will be retarded. For instance, in order to obtain a cold water-soluble reaction product by causing polyvinyl alcohol to react with urea in the presence of more than 10% of water by heating at 140° C., a large amount of urea is necessary, viz. an amount of urea which is more than 60% based on the weight of polyvinyl alcohol, will have to be added. According to the literature referred to above, it is presumed that the presence of water in an amount of more than 12% is required, even in the last stage of the reaction. Accordingly, if a water-soluble polyvinyl alcohol derivative is to be produced under such conditions, a large amount of urea is needed. The reaction between polyvinyl alcohol and urea may also be effected by applying heat after the polyvinyl alcohol has been dissolved in a large quantity of molten urea.

However, even when the reaction is carried out with the urea, in such molten condition, the quantity of urea needed is still more than 60% of the weight of polyvinyl alcohol. When the amount of urea is less than 50%, the melting of the urea will be insufficient, and a polyvinyl alcohol soluble in cold water will not be obtained. Thus, when a readily water-soluble polyvinyl alcohol derivative is desired, and the amount of urea used is more than 60%, based on the polyvinyl alcohol, the quantity of unreacted free urea remaining in the product after the reaction will be large, and a very complicated procedure is required to remove the unreacted urea when the reaction product is to be used for various purposes in which the large quantity of unreacted urea is objectionable. We have found, however, that by reducing the water content of a polyvinyl alcohol-urea mixture, which can be characterized as polyvinyl alcohol impregnated with urea, to less than 8%, and by applying heat in an inert environment, i.e. in a reaction zone in which the air has been replaced by an inert gas, a polyvinyl alcohol, more properly characterized as a polyvinyl alcohol derivative, which is readily soluble in cold water, can be produced by use of a very small amount of urea and in a short period of time.

In accordance with the invention, therefore, fully-saponified or partially-saponified polyvinyl alcohol is combined with urea to form a mixture having a moisture content of less than 8% by weight and the mixture is heated in an inert atmosphere.

The addition of urea to polyvinyl alcohol, suitably in particulate form, e.g. as a powder, can advantageously be effected by mixing the polyvinyl alcohol powder with urea in solution in water or in an organic solvent, or urea in finely-powdered form can be directly mixed with the polyvinyl alcohol powder. After mixing the urea and polyvinyl alcohol to produce a uniform mixture, the mixture is dried to remove the water or the organic solvent, and there is produced a product having a moisture content of less than 8%. The dried mixture is then placed in a container in which the air has been replaced with an inert gas, and heat is applied to provide a reaction temperature of 150°–230° C. When the amount of urea is less than 50% based on the amount of polyvinyl alcohol, the polyvinyl alcohol powder will not attain a molten condition upon heating at the indicated temperature, but will be in the powder state, but the reacton product will nevertheless be readily soluble in cold water. For the purpose of producing a readily cold water-soluble polyvinyl alcohol with an amount of urea less than 50% based on the weight of polyvinyl alcohol, the optimum heating temperature is 160°–210° C., and the optimum water content at the time of reaction is 1%–4%. When free contact with the air is allowed at the time of heating, and when the amount of urea used is less than 50% so that the polyvinyl powder will not attain a molten condition, there cannot be obtained a reaction product which is readily soluble in water. However, when the air is replaced with an inert gas, a reaction product which is a readily cold-water soluble polyvinyl alcohol derivative will be obtained.

For example, an aqueous solution of urea was added to a fully-saponified polyvinyl alcohol powder having an average degree of polymerization of 1700. Various samples were prepared by combining the polyvinyl alcohol with different amounts of urea, and after adjusting the water content of the resultant powder mixture to 2%, they were placed in glass tubes provided with capillary tubes at their tips, and heat-treatment was applied at 180° C. for 30 minutes. Depending upon the atmosphere in the various containers, the following results were obtained:

| Ratio of polyvinyl alcohol to urea | Atmosphere in the reaction container | Bonded nitrogen (percent) | Time required for the reaction product in film form to be dissolved in water at 30° C. (min.) |
|---|---|---|---|
| 100:100 | Air | 0.8 | 6.5 |
| 100: 30 | ___do___ | 0.2 | (¹) |
| 100: 10 | ___do___ | 0.1 | (¹) |
| 100:100 | Gas generated at the time of reaction. | 1.8 | 2.5 |
| 100: 30 | ___do___ | 0.9 | 5.5 |
| 100: 10 | ___do___ | 0.6 | 8.0 |
| 100:100 | Nitrogen | 2.1 | 0.5 |
| 100: 30 | ___do___ | 1.9 | 0.6 |
| 100: 10 | ___do___ | 1.6 | 0.6 |

¹ Insoluble.

Thus, if a readily soluble polyvinyl alcohol derivative is to be produced when the amount of urea is less than 50%, based on the weight of polyvinyl alcohol used, it is very important that contact with the air at the time of reaction be avoided by providing an atmosphere of an inert gas before reaction.

The reaction product has a content of combined nitrogen higher than 0.4%, and is readily soluble in water. Particularly when a very high solubility in cold water is exhibited, the amount of bonded nitrogen is 1%–4%. The minimum amount of urea needed for producing a readily soluble reaction product is 2% based on the weight of polyvinyl alcohol.

The polyvinyl alcohol suitable for use in accordance with the present invention is known polyvinyl alcohol and includes polymers composed principally of the vinyl alcohol radical. Polyvinyl alcohol is a polymer containing hydroxyl groups and corresponding to the formula:

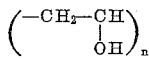

wherein $n$ is an integer which can vary within wide limits, as is well-known in the art. Polyvinyl alcohol can be produced from the corresponding polyvinyl ester, e.g. polyvinyl acetate, by alkaline or acid saponification or re-esterification, i.e. alcoholysis, in accordance with the following equation:

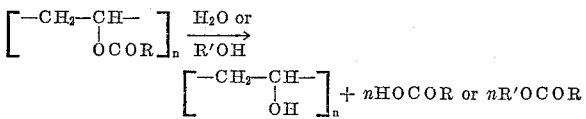

Typical fully-saponified polyvinyl alcohols which can be suitably used are described, for example, in Cline et al. U.S. Patent 2,636,803.

The partially-saponified or partially-esterified polyvinyl alcohol which can be used in accordance with this invention is produced by conventional techniques from polyvinyl esters, such as polyvinyl acetate, by known saponification procedures as described, for example, in Scott et al. U.S. Patent 2,266,996 and Bryant et al. U.S. Patent No. 2,668,809. As is known in the art, a "partially-saponified" polyvinyl alcohol is the product of the hydrolysis of a polyvinyl ester, e.g. polyvinyl acetate, in which less than all of the ester groups, e.g. acetate groups, have been converted to hydroxyl groups. As explained in Scott et al. 2,266,996, the saponification or hydrolysis reaction is stopped by neutralizing the catalyst when the desired percentage conversion has occurred. The partially-saponified polyvinyl alcohols which are suitably used in accordance with this invention are sufficiently saponified that at least about 50% of the ester groups have been converted into hydroxyl groups. The degree of polymerization of the polyvinyl alcohol, may vary widely but is suitably at least about 1000.

The cold-water-soluble polyvinyl alcohol composition produced in accordance with this invention is particularly useful for all purposes for which a water-soluble polyvinyl alcohol is desired, e.g. in adhesives, to form films or other shaped forms which are to be used for purposes where water-solubility is desired, in finishing agents and as quality improving agents for fabrics, but it is by no means limited to such uses. The cold-water-soluble polyvinyl alcohol composition may be combined with fillers and pigments such as clay, kaolin, and the like in conventional manner.

The conditions and the relative relationship set forth in the examples are those preferred in carrying out the process of this invention, but it will be understood that other conditions and relationships may be used within the scope of the invention. In general, unless otherwise indicated, conventional operations and techniques are suitably employed, and all parts are by weight.

*Example 1*

To 100 g. of fully-saponified polyvinyl alcohol, in powder form and having an average degree of polymerization of 1700, was added an aqueous solution prepared by dissolving 20 g. of urea in 100 g. of water, and the powder and the solution were mixed well. The resulting mixture was then dried at 50° C. to a water content of 1.5%. The dried mixture was placed in a glass tube, and after replacing the air in the tube with nitrogen, the tube was sealed, and heated at 160° C. for 30 minutes. The white powder thus obtained was found to have a content of bound nitrogen of 1.0%, and the amount of free urea in the reaction product was 12%. A film produced in conventional manner from a water solution of this reaction product at 50° C. was colorless and transparent, and such a film having a thickness of 0.03 mm. was found to dissolve in water at 20° C. in 3 minutes.

*Example 2*

To 100 g. of fully-saponified polyvinyl alcohol, in powder for and having an average degree of polymerization of 1700, was added an aqueous solution prepared by adding 5 g. of urea to 100 g. of water, and the powder and solution were thoroughly mixed. The resultant solution was dried at 50° C. and to a water content of 2.3%. This dried product was placed in a glass tube, and after the tip of the glass tube was formed into a capillary tube, the air in the tube was substituted by nitrogen, and then heat was applied at 200° C. for 20 minutes. The reaction product thus obtained had a slightly yellowish color, and its nitrogen content was about 0.8%, and the amount of free urea in the reaction product was 1.2%. This product was fully soluble in hot water, and a film prepared from an aqueous solution of the product at 50° C. was transparent. Such a film having a thickness of 0.03 mm. was found to dissolve in water at 20° C. in 6 minutes.

*Example 3*

To 200 g. of partially-saponified polyvinyl alcohol, in powder form and with a degree of saponification of 88% and an average degree of polymerization of 1700, was added a solution prepared by dissolving 40 g. of urea in 300 g. of methanol, and the components thoroughly mixed. The resultant mixture was dried at 50° C. to remove the methanol, and there was produced a product having a moisture content of 2.0%. This product was placed in a stainless steel autoclave, and after the air in the autoclave was replaced with nitrogen, the mixture was heated at 180° C. for 30 minutes. The reaction product obtained from such heating, which was a white powder, had a 2.0% content of bound nitrogen, and the amount of free urea in the reaction product was 6%. This product was readily soluble in water. From a water solution of the product at 50° C. there was produced in conventional manner a film, which was colorless and transparent. A film of the product with a thickness of 0.03 mm. was found to dissolve in water at 20° C. in 30 seconds. When compared with a film produced from the initial partially-saponified polyvinyl alcohol, the water-solubility of the film produced from the reaction product was found to be more stable to acid and alkali, and was less affected by them.

The conditions and the relative relationships set forth in the examples are those preferred in carrying out the process of this invention, but it will be understood that other conditions and relationships may be used within the scope of the invention. As mentioned above, in general, unless otherwise indicated, conventional operations and techniques are used and conventional apparatus is suitably employed, e.g. conventional mixing apparatus and conventional reactors are advantageously employed. Pressure does not appear to be a parameter of the process which may be carried out at atmospheric pressure or at superatmospheric pressure, any superatmospheric pressure being that normally developed in the apparatus in which heating is effected.

If desired, the nitrogen-containing polyvinyl alcohol product may be processed into shaped forms in accordance with conventional techniques used in the polyvinyl alcohol art. Thus, to form fibers, the compositions are spun in conventional manner, e.g. by extruding an aqueous solution through small holes in a spinning jet into a medium effective to remove water therefrom. In wet spinning processes the medium can, for example, be a concentrated aqueous solution of a coagulating salt such as sodium sulfate or ammonium sulfate, while in dry spinning techniques air or an inert gas such as nitrogen is employed. Suitable spinning conditions for producing fibers from the spinning solutions of this invention are described, for example, in U.S. Patent 2,642,333 as well as in Cline et al. U.S. Patent 2,636,803 and Osugi et al. U. S. Patent 2,906,594.

The products are similarly formed into other shapes, such as films, by conventional techniques. Thus, films are suitably produced by the procedure described, for example, in Izard et al. U.S. 2,236,061 and in Herrmann et al. U.S. Patent 2,837,770.

It will also be understood that various changes and modifications in addition to those indicated above may be made in the embodiments herein described without departing from the scope of the invention as defined in the appended claims. It is intended, therefore, that all matter contained in the foregoing description shall be interpreted as illustrative only and not as limitative of the invention.

We claim:

1. A process of making a polyvinyl alcohol-urea reaction product which is readily soluble in water which consists of, preparing a mixture consisting of polyvinyl alcohol and urea whereby said mixture has a maximum moisture content of 8% based on the weight of said mixture, said urea in said mixture being present in an amount not exceeding 50% by weight based on the weight of said polyvinyl alcohol in said mixture, heating said mixture at a temperature of 150° C. to 230° C. in a reaction zone whereby said polyvinyl alcohol and said urea react, maintaining an inert environment in said reaction zone during the said heating of said mixture whereby free contact of said mixture with air is prevented, and recovering from said reaction zone said polyvinyl alcohol-urea reaction product which is readily soluble in water.

2. A process of making a polyvinyl alcohol-urea reaction product which is readily soluble in water and which contains about 0.4% combined nitrogen which consists of, mixing polyvinyl alcohol powder and an aqueous solution of urea to form a mixture consisting of polyvinyl alcohol and urea and said urea in said mixture being present in an amount not exceeding 50% by weight based on the weight of said polyvinyl alcohol in said mixture, drying said mixture to produce a dried mixture consisting of polyvinyl alcohol and urea having a maximum moisture content of 8% based on the weight of said dried mixture, heating said dried mixture in a reaction zone at a temperature of 150° C. to 230° C. whereby said polyvinyl alcohol and said urea react, maintaining an inert environment in said reaction zone during said heating of said dried mixture by the use of an inert gas whereby contact of said dried mixture with air is prevented, and recovering from said reaction zone said polyvinyl alcohol-urea reaction product.

3. A polyvinyl alcohol-urea reaction product which is readily soluble in water produced by a process which consists of, preparing a mixture consisting of polyvinyl alcohol and urea where said mixture has a maximum moisture content of 8% based on the weight of said mixture and where said urea in said mixture being present in an amount not exceeding 50% by weight based on the weight of said polyvinyl alcohol in said mixture, and heating said mixture in a reaction zone at a temperature of 150° C. to 230° C. while maintaining an inert environment in said reaction zone during said heating whereby contact of said mixture with air is prevented.

4. A process of making a polyvinyl alcohol-urea reaction product which is readily soluble in water which consists of, preparing a mixture consisting of polyvinyl alcohol and urea whereby said mixture has a maximum moisture content of 8% based on the weight of said mixture, said urea in said mixture being present in an amount of at least 2% by weight and not exceeding 50% by weight based on the weight of said polyvinyl alcohol in said mixture, heating said mixture at a temperature of 150° C. to 230° C. in a reaction zone whereby said polyvinyl alcohol and said urea react, maintaining an inert environment in said reaction zone by the use of an inert gas during the said heating of said mixture whereby free contact of said mixture with air is prevented, and recovering from said reaction zone said polyvinyl alcohol-urea reaction product which is readily soluble in water.

References Cited in the file of this patent

Chemical Abstracts, volume 46, column 28 49d (re. Japanese Patent 172,065 to Ota).

Zeitschrift für Naturforschung, volume 1, page 523, 1946.